3,275,446
EATING-INDUCING COMPOSITIONS FOR
SILKWORMS
Yasuji Hamamura, Keizo Hayashiya, and Kenichi Naito, Kyoto, Japan, assignors, by direct and mesne assignments, of one-half to Yasuji Hamamura, Kyoto, Japan, and one-half to Takeda Chemical Industries Ltd., Osaka, Japan, a corporation of Japan
No Drawing. Filed Nov. 8, 1963, Ser. No. 322,497
Claims priority, application Japan, Mar. 6, 1961, 36/7,616, 36/7,617, 36/7,618; Sept. 22, 1961, 36/34,349; Oct. 20, 1961, 36/37,901; Dec. 1, 1961, 36/46,972
11 Claims. (Cl. 99—2)

This application is a continuation in part of application Serial No. 176,105 filed February 27, 1962 (and now abandoned).

The present invention relates to feedstuff for silkworms, and more particularly to compositions which induce silkworms to eat, and to the biting-stimulating agent, the swallowing-stimulating agent and the attracting agent for silkworms contained therein.

While silkworms are known to be monophagous in eating nothing but mulberry leaves, no exact reason for this has ever been made clear. As the result of extensive studies on the mechanism causing silkworms to select only mulberry leaves as their natural food, the present inventors have found that in mulberry leaves there are contained factors such as the attracting factor which attracts silkworms, the biting factor which induces them to bite, the swallowing factor which stimulates them to bite and swallow continuously, that these factors conjointly work on silkworms for inducing them to eat mulberry leaves, and that these three factors are indispensable only for the eating of mulberry leaves by silkworms, though the attracting factor can be omitted when the silkworms are placed on the feed.

The present inventors have discovered that terpenes are the attracting factor; $\beta$-sitosterol with or without flavonoids is the biting factor; and cellulose powder is the swallowing factor.

Further study made it clear that sufficient effect for inducing silkworms to eat cannot be expected by feeding them a composition containing only $\beta$-sitosterol and cellulose powder, even when silkworms are placed on the composition, while the two components are irreplaceable substances for the purpose. During further continuance of the study, the present inventors discovered that a sugar and an inorganic phosphate should be present together with the $\beta$-sitosterol and cellulose powder so as to sufficiently induce silkworms to eat.

Other conditions of the feedstuff, for example, taste, nutritional value and physical state, are inferred, in a strict meaning, to be of merely secondary significance in regard to the action of eating, although they should certainly be considered in connection with the insectal growth.

The first object of this invention is to provide compositions which induce silkworms to eat. The second object lies in stimulating silkworms in biting. The third object lies in stimulating silkworms in swallowing. A further object lies in attracting silkworms toward the feedstuff. The first object is realized by preparing compositions containing $\beta$-sitosterol with or without flavonoid, cellulose powder, sugar and inorganic phosphate, and a terpene when an attractant is necessary. The second and third objects are realized by incorporating in the feedstuff for silkworms agents containing $\beta$-sitosterol with or without flavonoid, and also adding thereto agents containing cellulose powder, respectively. The said further object is realized by adding a terpene to the feedstuff for silkworms.

According to this invention, an eating inducing composition for silkworms comprises $\beta$-sitosterol, cellulose powder, sugar, an inorganic phosphate and a terpene, it being understood, however, that the terpene can be omitted when the silkworms are placed on the feed and hence when no attractant is required. For the practical feeding, addition of auxiliary factors may come into consideration.

Silkworms display a remarkable appetite for the compositions of this invention, to the same or even a greater extent as compared with the case when mulberry leaves alone are fed to them. This is a surprising finding because to the best of our knowledge the finding has overthrown the previously established theory in sericulture dependent solely on mulberry leaves.

Table I shows the result of an attracting test of silkworms which is carried out as follows:

Six small circles along the circumference of a round filter paper are drawn in equal intervals and the paper is set in a dish (diameter: 8.5 cm.). A certain amount of each solution of the samples is absorbed on 0.25 gram cellulose powder, the solvent is evaporated in the air, and then water is sprayed on it; on the other hand, the same amount of cellulose powder containing a small amount of water is prepared as control. These cellulose powders are divided into three portions respectively and the thus prepared control cellulose powders and samples are put on the six circles alternately. Thirty hatched larvae are placed on the center of the filter paper. After leaving the dish standing at 24° C. for one hour, the number of larvae gathered to each powder and wandering at the intermediate space are counted.

TABLE I

| Concentration | ¼ | | | ½ | | | 1 | | | 3 | | | 5 | | |
|---|---|---|---|---|---|---|---|---|---|---|---|---|---|---|---|
| Position | S | C | I | S | C | I | S | C | I | S | C | I | S | C | I |
| Terpinyl acetate | 10 | 6 | 14 | 9 | 3 | 18 | 13 | 6 | 11 | 10 | 8 | 12 | 10 | 10 | 4 |
| Linalyl acetate | 19 | 7 | 4 | 25 | 1 | 4 | 17 | 12 | 1 | 17 | 11 | 2 | 19 | 3 | 8 |
| Citral | 20 | 7 | 3 | 19 | 6 | 5 | 13 | 13 | 4 | 6 | 13 | 11 | 10 | 15 | 5 |
| Linalol | 14 | 4 | 12 | 11 | 2 | 17 | 20 | 0 | 10 | 22 | 2 | 6 | 21 | 8 | 1 |

In the above table concentration 1 means that 1 milliliter of a 0.01 weight/volume percent ethereal solution of the substances is absorbed by 0.25 gram cellulose powder and the powder is divided into three portions; concentration ½ means ½ milliliter of the solution and so on. S, C and I mean sample, contorl and intermediate space, respectively.

Table II shows the result of the test of biting action of silkworms on agar thread which is softened with a small amount of water and sprayed with a 5 percent ethereal solution of $\beta$-sitosterol.

TABLE II

β-sitosterol (triple spray) ------------------ +++++
Control ---------------------------------- -----

In the test 10 larvae were employed, and +++++ denotes that all larvae bit the agar thread and ----- denotes that none of the larvae bit the agar thread.

In the composition of this invention the sugar and inorganic phosphate appear to be primarily related to the taste of the food and to the swallowing action of the silkworms, respectively.

The sugar employed in this invention may be, for example, sucrose, fructose, glucose, etc. The flavonoid may be quercetin, morin, rutin, isoquercitrin, etc., and the terpene may be citral, linalyl acetate, linalol, terpinyl acetate, etc. The inorganic phosphate employed in this invention, is for example, potassium dihydrogen phosphate, dipotassium hydrogen phosphate, sodium dihydrogen phosphate, disodium hydrogen phosphate, calcium phosphate, etc. Among these inorganic phosphates, potassium dihydrogen phosphate has been found to be preferred.

The cellulose powder employed in this invention is, in most cases, preferably coated with silica.

The respective quantities of components of compositions of this invention may be varied depending on various conditions such as instar or the state of the silkworms, and the kind or quantity of the other components in the artificial feed. Generally the β-sitosterol is present in the amount of about 0.1 to 1 percent; the cellulose powder 20 to 60 percent; the sugar 1 to 10 percent; the inorganic phosphate 0.2 to 2 percent; the terpene in a trace amount (0.001 to 0.01 percent), and the flavonoid 0.1 to 0.3 percent. (All percentages are weight/weight unless otherwise described, based on the total weight of the artificial feed.) In some cases, the amount of cellulose powder may be more than 20 to 60 percent, because cellulose powder also serves the roll of a carrier.

In most cases the compositions of this invention may be utilized in powdery form for a practical application by mixing with various components which are necessary for the growth of silkworms, e.g. protein, starch, vitamins, minerals, etc., to obtain the artificial feed with which silkworms can be fed without any mulberry leaves to produce normal cocoons. The compositions may also be used in jelly or paste form with agar or starch.

The further addition of inositol may result in bringing about a preferred effect in many cases.

The following non-limitative examples are given for the purpose of illustrating embodiments of this invention, it being understood that modifications and variations of the compositions herein described in the specification and claims are included in the scope of this invention.

Example 1

| | |
|---|---|
| β-Sitosterol _____ parts by weight__ | 0.3 |
| Cellulose powder _____ do____ | 40 |
| Sucrose _____ do____ | 15 |
| $K_2HPO_4$ _____ do____ | 0.6 |
| 2% agar solution _____ parts by volume__ | 150 |

Example 2

| | Parts by weight |
|---|---|
| Citral _____ | 0.1 |
| β-Sitosterol _____ | 5 |
| Isoquercitrin or morin _____ | 3 |
| Cellulose powder (preferably coated with 40 mg. of silica sol) _____ | 700 |
| Sucrose (or glucose or fructose) _____ | 30 |
| Inositol _____ | 5 |
| $K_2HPO_4$ _____ | 10 |

The components mentioned above are thoroughly admixed and added to 2000 to 3000 parts by volume of a 2 percent agar solution or to 2000 to 3000 parts by volume of a 10 percent starch paste.

What is claimed is:

1. A composition for inducing silkworms to eat comprising β-sitosterol, cellulose powder, a sugar, an inorganic phosphate and a flavonoid.

2. A composition for inducing silkworms to eat comprising β-sitosterol, cellulose powder, a sugar, an inorganic phosphate, a terpene and a flavonoid.

3. A composition for inducing silkworms to eat comprising the following ingredients in approximately the following relative proportions by weight based on the total weight of the composition:

| | Percent |
|---|---|
| β-Sitosterol _____ | 0.1 to 1 |
| Cellulose powder _____ | 20 to 60 |
| Sugar _____ | 1 to 10 |
| Inorganic phosphate _____ | 0.2 to 2 |
| Terpene _____ | 0.001 to 0.01 |
| Flavonoid _____ | 0.1 to 0.3 |

4. A composition for inducing silkworms to eat comprising the following ingredients in approximately the following relative proportions based on the total weight of the composition:

| | Parts by weight |
|---|---|
| Citral _____ | 0.1 |
| β-Sitosterol _____ | 5 |
| Isoquercitrin or morin _____ | 3 |
| Cellulose powder _____ | 700 |
| Sucrose _____ | 30 |
| Inositol _____ | 5 |
| $K_2HPO_4$ _____ | 10 |

5. A composition according to claim 3, wherein the cellulose powder is coated with silica.

6. A composition according to claim 3, wherein the sugar is selected from the group consisting of fructose, glucose and sucrose.

7. A composition according to claim 3, wherein the inorganic phosphate is $K_2HPO_4$.

8. A composition according to claim 3, wherein the terpene is selected from the group consisting of terpinyl acetate, linalyl acetate, linalol and citral.

9. A composition according to claim 3, wherein the flavonoid is selected from the group consisting of isoquercitrin and morin.

10. A composition for inducing silkworms to eat comprising β-sitosterol, cellulose powder, a sugar, an inorganic phosphate, a flavonoid and inositol.

11. A composition for inducing silkworms to eat comprising β-sitosterol, cellulose powder, a sugar, an inorganic phosphate, a terpene, a flavonoid and inositol.

References Cited by the Examiner

UNITED STATES PATENTS

| | | | |
|---|---|---|---|
| 879,877 | 2/1908 | Kennedy _____ | 71—23 |
| 1,990,343 | 2/1935 | Naruse _____ | 99—2 |

OTHER REFERENCES

Chemical Abstracts, vol. 55, p. 8673. Abstract taken from Ito, J. Insect Physiol. 5, 95–107 (1960).

Harper, Review of Physiological Chemistry, 9th ed., p. 224, Lange Medical Publications, Los Altos, Calif. (1963).

Ito (I), Verhandlungen, XI Internationaler Kongress Fur Entomologie, Band III, pp. 157–161, Instituto di Entomologia Agraria dell Universita di Pavia (Italy), 1960.

Ito (II), J. Insect Physiology, 5, pp. 95–107 (1960). Pages 95–6 relied on.

Ito, Nature, vol. 191, pp. 882–83, Aug. 26, 1961.

Watanabe, Nature, vol. 182, pp. 325–26, Aug. 2, 1958.

Rose et al., Condensed Chemical Dictionary, pp. 241, 740, 1073, Reinhold Publishing Corp., New York, N.Y. (1956).

A. LOUIS MONACELL, *Primary Examiner.*

D. J. DONOVAN, *Assistant Examiner.*